United States Patent Office 2,963,896
Patented Dec. 13, 1960

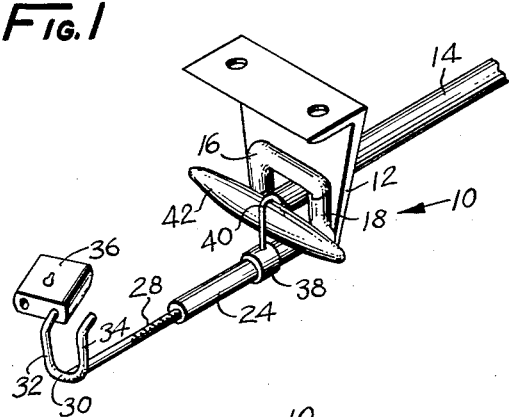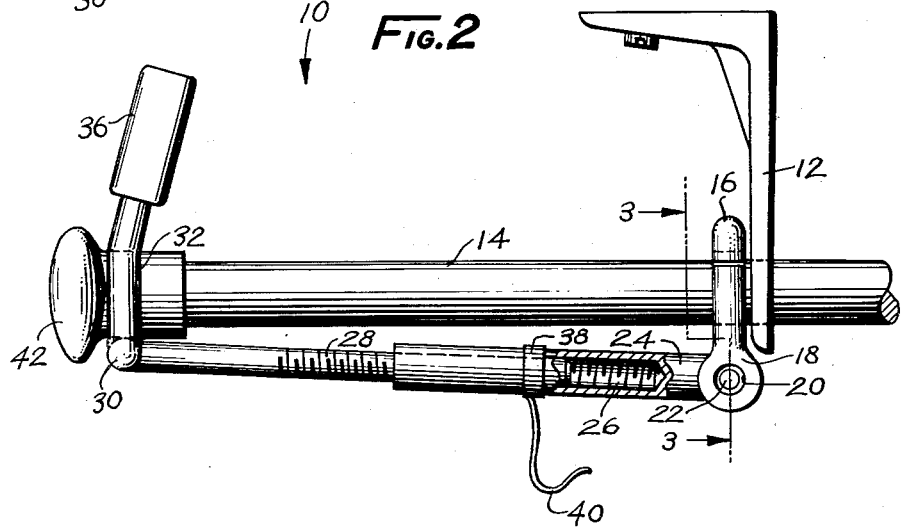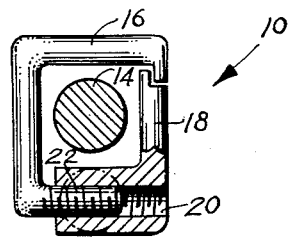
INVENTOR.
ROBERT B. HOFFMAN

2,963,896
CAR HANDBRAKE LOCKING DEVICE
Robert B. Hoffman, Towson, Md., assignor of one-tenth to Gadget-Of-The-Month Club, Inc., North Hollywood, Calif., a corporation of California Filed Apr. 2, 1959, Ser. No. 803,745
4 Claims. (Cl. 70—181)

This invention relates to vehicles and more particularly to a safety accessory therefor.

It is an object of the present invention to provide a device for locking longitudinally movable handbrakes of vehicles in an engaged position so as to prevent accidental release thereof by children left alone in the vehicle.

A further object of the present invention is to provide a handbrake locking device of the above type which may be used to effectively secure the handbrake in an engaged position, so as to prevent theft of the vehicle or unauthorized tampering therewith.

Other objects of the invention are to provide a handbrake locking device bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a perspective view of a handbrake locking assembly made in accordance with the present invention in operative use with the handbrake in a released position;

Figure 2 is an enlarged side elevational view of the assembly shown in Figure 1 with the handbrake in an engaged position; and Figure 3 is a transverse cross sectional view taken along line 3—3 of Figure 2.

Referring now more in detail to the drawing, a handbrake locking device 10 made in accordance with the present invention is shown in operative association with a shaft type automotive vehicle handbrake in which the operating shaft 14 thereof is slidably guided by a bracket 12 that is usually mounted beneath the dashboard of the vehicle. A C-shaped collar portion 16 has a threaded stud 22 at one end that is threadedly engaged within a similarly threaded bore 20 of an L-shaped collar portion 18 for selective pivotal movement between a normally closed frame-like position and an open position in which the C-portion 16 receives the shaft 14 of the handbrake transversely therewithin. An elongated sleeve 24 extending substantially normal to the general plane of the L-shaped portion 18 of the collar defines a longitudinal internally threaded bore 26 for adjustable threaded engagement with a threaded shaft 28 which is integral with the center of the bight portion 30 of a substantially U-shaped yoke. Since the sleeve 24 is integral with the L-shaped portion 18, it maintains the frame that includes the L-shaped portion 18 and C-shaped portion 16 in the closed locked position when in the engaged position illustrated in Figure 2.

The U-shaped yoke further includes a pair of spaced apart arms 32, 34, one such arm 32 of which pivotally supports a padlock 36 which may be swivelled into locking engagement with the other such arm 34.

In actual use, the device is supported upon the handbrake shaft 14 in an inoperative position by means of a hanger hook 40, by a rotatably supported sleeve 38 encircling the center of the sleeve 24. However, when moving the assembly from the released position illustrated in Figure 1, to the engaged position shown in Figure 2, it is only necessary to first withdraw the handbrake handle 42 and shaft 14 in a normal brake engaging manner. With the shaft 14 and handle 42 in the extended position relative to the bracket 12, shown in Figure 2, the yoke arms 32, 34 are engageable with the side of the handle 42 facing the bracket 12, while the frame which includes the C-shaped portion 16 and L-shaped portion 18 is in abutting engagement with the facing side of the bracket 12. By thus engaging the padlock 36, the handle 42 and shaft 14 are locked in the extended brake engaging position, thus preventing unauthorizer tampering with the vehicle. When the owner of the vehicle wishes to drive the automobile, it is only necessary to unlock the padlock 36, and swing the connected shaft 28 and sleeve 24 downwardly out of abutting relationship with the handle 42 so as to enable the handle 42 and shaft 14 to be moved inwardly toward the brake release position shown in Figure 1, in which position the hanger 40 may be rotated to support the assembly in a convenient position for the next use, as shown in Figure 1.

While various changes may be made in the detail construction, it shall be understood that such changes shall be within the spirit and scope of the present invention as defined by the appended claims.

What I claim as new and desire to protect by Letters Patent of the United States is:

1. A handbrake locking device for shaft type automotive vehicle handbrakes of the kind supported for reciprocating axial movement comprising, in combination, a handbrake shaft receiving collar, a handbrake handle engaging yoke, and an adjustable stop maintaining said yoke in longitudinally spaced apart relationship with said collar, said collar being supported for facing abutting engagement with a guide slidably carrying the handbrake shaft, said yoke being releasably engageable with the handbrake handle to limit inward movement of the handbrake shaft, and a lock releasably securing said yoke in engagement with the handle; said shaft receiving collar comprising a C-shaped portion having a threaded stud at one extremity, and an L-shaped portion having an internally threaded bore extending through one leg threadedly receiving said stud of said C-shaped portion, whereby said L-shaped portion is rotatable between a normally closed co-planar position with said C-shaped portion and an open position in which said C-shaped portion receives the handbrake shaft transversely therewithin.

2. The combination according to claim 1, wherein said handle receiving yoke comprises a substantially U-shaped bail having a central bight portion and a pair of spaced apart parallel legs releasably receiving the handbrake shaft therewithin intermediate said handle and said guide.

3. The combination according to claim 2, wherein said adjustable stop comprises a threaded shaft integral with the bight portion of said yoke and extending substantially normal to the general plane thereof, and an internally threaded sleeve integral with said L-shaped portion of said collar extending substantially normal to the general plane thereof, said internally threaded sleeve threadedly and adjustably receiving said threaded shaft of said yoke for adjusting the distance between said collar and said yoke.

4. The combination according to claim 3, further comprising a hook pivotally carried upon said sleeve for selective rotation into supported engagement with the handle of the handbrake shaft in response to disengagement of said yoke with the handbrake handle and movement of the handbrake shaft toward a brake released position.

References Cited in the file of this patent

UNITED STATES PATENTS

| | | |
|---|---|---|
| 1,025,180 | Wreford | May 7, 1912 |
| 2,709,356 | Bristow | May 31, 1955 |
| 2,846,864 | Polston | Aug. 12, 1958 |